(12) United States Patent
Damnjanovic et al.

(10) Patent No.: US 10,462,713 B2
(45) Date of Patent: Oct. 29, 2019

(54) TECHNIQUES FOR HANDOVER PROCEDURE MANAGEMENT

(71) Applicant: QUALCOMM Incorporated, San Diego, CA (US)

(72) Inventors: Aleksandar Damnjanovic, Del Mar, CA (US); Durga Prasad Malladi, San Diego, CA (US); Madhavan Srinivasan Vajapeyam, San Diego, CA (US); Ozcan Ozturk, San Diego, CA (US); Onkar Jayant Dabeer, San Diego, CA (US); Wanshi Chen, San Diego, CA (US); Hao Xu, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 146 days.

(21) Appl. No.: 14/866,546

(22) Filed: Sep. 25, 2015

(65) Prior Publication Data
US 2016/0127955 A1    May 5, 2016

Related U.S. Application Data

(60) Provisional application No. 62/072,874, filed on Oct. 30, 2014.

(51) Int. Cl.
*H04W 36/00* (2009.01)
*H04W 92/20* (2009.01)

(52) U.S. Cl.
CPC ... *H04W 36/0055* (2013.01); *H04W 36/0072* (2013.01); *H04W 36/0083* (2013.01); *H04W 92/20* (2013.01)

(58) Field of Classification Search
CPC ..................................................... H04W 36/00
See application file for complete search history.

(56) References Cited

U.S. PATENT DOCUMENTS

| | | |
|---|---|---|
| 2008/0225796 A1 | 9/2008 | Malladi et al. |
| 2008/0268850 A1 | 10/2008 | Narasimha et al. |

(Continued)

FOREIGN PATENT DOCUMENTS

| | | |
|---|---|---|
| EP | 2 785 122 A1 | 10/2014 |
| GB | 2 493 183 A | 1/2013 |

(Continued)

OTHER PUBLICATIONS

International Search Report and Written Opinion—PCT/US2015/052674—ISA/EPO—dated Dec. 21, 2015. (15 total pages).

*Primary Examiner* — Sulaiman Nooristany
(74) *Attorney, Agent, or Firm* — Anthony R. Morris

(57) ABSTRACT

Techniques for handover procedure management are described herein. An example method may include monitoring, at a target base station, reference signal information associated with a UE based on a reference signal configuration of the UE received by the target base station from a source base station. Additionally, the example method may include estimating, at the target base station, timing information for the UE based on the reference signal information. Further, the example method may include transmitting, by the target base station, the timing information to the source base station, where the source base station provides the timing information to the UE for handover to the target base station.

18 Claims, 13 Drawing Sheets

(56) References Cited

U.S. PATENT DOCUMENTS

| | | | | |
|---|---|---|---|---|
| 2013/0188612 A1* | 7/2013 | Dinan | ............... | H04W 56/0005 |
| | | | | 370/336 |
| 2014/0038613 A1* | 2/2014 | Toskala | ................ | H04W 36/20 |
| | | | | 455/436 |
| 2014/0105191 A1* | 4/2014 | Yang | .................... | H04L 1/1867 |
| | | | | 370/336 |
| 2014/0198767 A1* | 7/2014 | Heo | ................... | H04W 36/023 |
| | | | | 370/331 |
| 2014/0308956 A1* | 10/2014 | Zhang | .............. | H04W 56/0055 |
| | | | | 455/436 |
| 2015/0230134 A1* | 8/2015 | Chiba | .............. | H04W 36/0016 |
| | | | | 370/331 |

FOREIGN PATENT DOCUMENTS

| | | | |
|---|---|---|---|
| JP | 2011527147 | A | 10/2011 |
| JP | 2012531141 | A | 12/2012 |
| JP | 2014510479 | A | 4/2014 |
| WO | WO-2012/139624 | A1 | 10/2012 |
| WO | WO-2013/074461 | A1 | 5/2013 |

\* cited by examiner

TECHNIQUES FOR HANDOVER PROCEDURE MANAGEMENT

CLAIM OF PRIORITY

This is an application claiming priority to Provisional Application No. 62/072,874 entitled "TECHNIQUES FOR HANDOVER PROCEDURE MANAGEMENT" filed on Oct. 30, 2014, and assigned to the assignee hereof and hereby expressly incorporated by reference herein.

BACKGROUND

The described aspects relate generally to wireless communication systems. More particularly, the described aspects relate to techniques for handover procedure management.

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems. These multiple access technologies have been adopted in various telecommunication standards to provide a common protocol that enables different wireless devices to communicate on a municipal, national, regional, and even global level.

An example of an emerging telecommunication standard is Long Term Evolution (LTE). LTE is a set of enhancements to the Universal Mobile Telecommunications System (UMTS) mobile standard promulgated by Third Generation Partnership Project (3GPP). It is designed to better support mobile broadband Internet access by improving spectral efficiency, lower costs, improve services, make use of new spectrum, and better integrate with other open standards using OFDMA on the downlink (DL), SC-FDMA on the uplink (UL), and multiple-input multiple-output (MIMO) antenna technology. However, as the demand for mobile broadband access continues to increase, there exists a need for further improvements in LTE technology. Preferably, these improvements should be applicable to other multi-access technologies and the telecommunication standards that employ these technologies.

In wireless communication systems employing LTE, when a UE is in communication with a source base station but in the process of, for example, being handed over to a target base station, the UE may transmit relevant information over a physical random access channel (PRACH) for the target base station to determine timing information associated with the UE, e.g., timing advance (TA) for the UE. A procedure involving transmission of the relevant information over a PRACH may cause significant latency in the handover procedure. Added latency to a handover procedure may, for example, result in service interruption during the procedure.

Therefore, there is a desire for techniques that reduce latency when the UE is handed over from the source base station to the target base station.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

The present disclosure presents examples of techniques for managing a handover procedure. An example method may include monitoring reference signal information associated with a UE based at least in part on a reference signal configuration of the UE received from a source base station. Additionally, the example method may include estimating timing information for the UE based at least in part on the reference signal information. Further, the example method may include transmitting the timing information to the source base station, wherein the source base station provides the timing information to the UE for handover to the target base station.

An example apparatus may include means for means for monitoring reference signal information associated with a UE based at least in part on a reference signal configuration of the UE received from a source base station. Additionally, the example apparatus may include means for estimating timing information for the UE based at least in part on the reference signal information. Further, the example apparatus may include means for transmitting the timing information to the source base station, wherein the source base station provides the timing information to the UE for handover to the target base station.

An example computer-readable medium storing computer executable code may include code for monitoring reference signal information associated with a UE based at least in part on a reference signal configuration of the UE received from a source base station. Additionally, the example computer-readable medium may include code for estimating timing information for the UE based at least in part on the reference signal information. Further, the example computer-readable medium code for transmitting the timing information to the source base station, wherein the source base station provides the timing information to the UE for handover to the target base station.

Another example apparatus may include a reference signal monitor configured to monitor reference signal information associated with a UE based at least in part on a reference signal configuration of the UE received from a source base station. Further, the example apparatus may include a timing estimator configured to estimate timing information for the UE based at least in part on the reference signal information. In addition, the example apparatus may include a communication module configured to transmit the timing information to the source base station, wherein the source base station provides the timing information to the UE for handover to the target base station.

Another example method for handover procedure management by a source base station may include transmitting a reference signal configuration of a UE to a target base station. Additionally, the example method may include receiving timing information from the target base station, wherein the timing information is estimated by the target base station based at least in part on reference signal information of the UE that is monitored by the target base station using the reference signal configuration. Further, the example method may include transmitting the timing information to the UE. In at least some examples, the example method for handover procedure management by a source base station may also be implemented as code stored in a computer-readable medium, apparatuses, or other devices.

BRIEF DESCRIPTION OF THE DRAWINGS

The disclosed aspects will hereinafter be described in conjunction with the appended drawings, provided to illustrate and not to limit the disclosed aspects, wherein like designations denote like elements, and in which.

DETAILED DESCRIPTION

Figure 1:
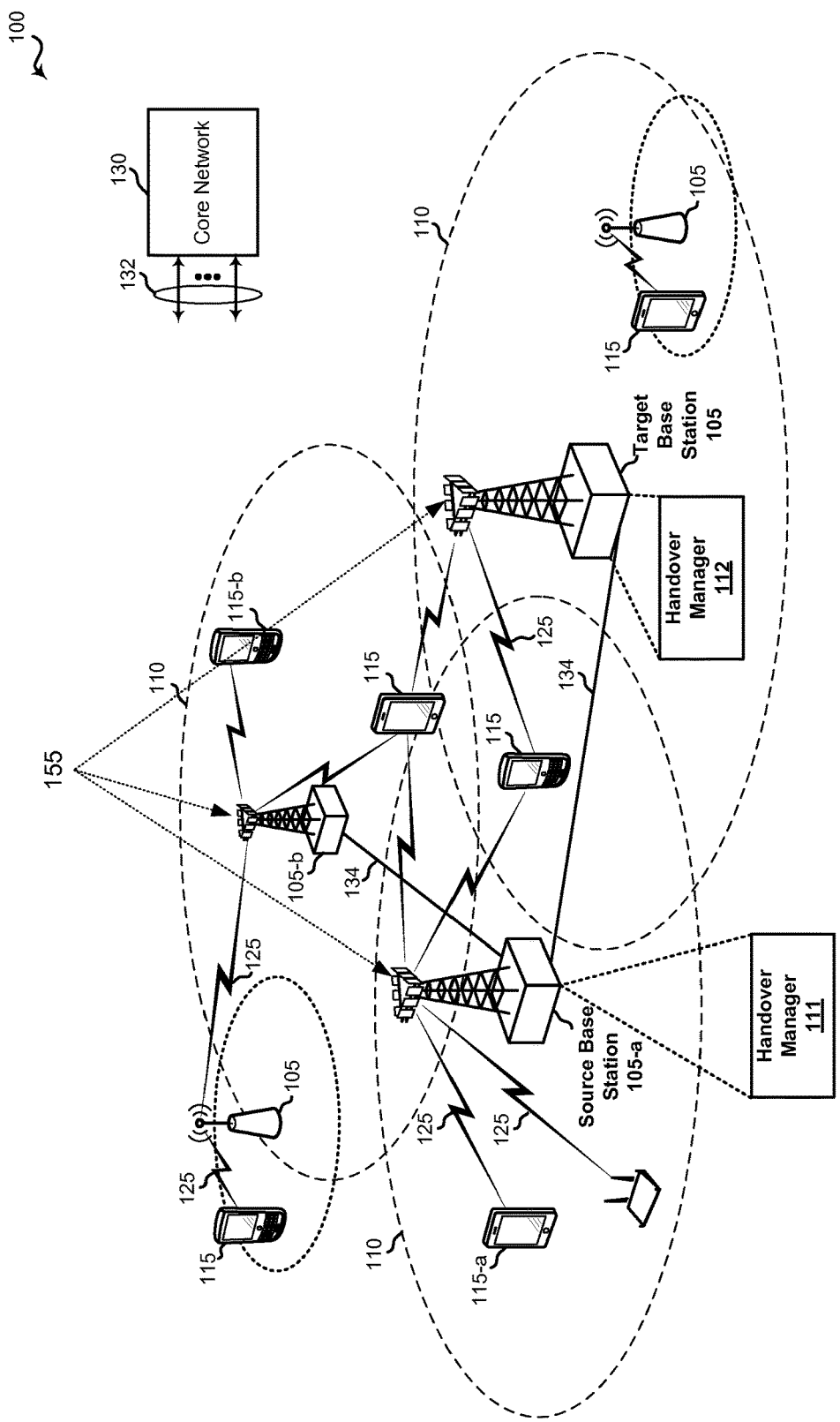
FIG. 1 is a block diagram illustrating a wireless communication system in which handover procedure management may be implemented.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, modules, components, circuits, steps, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented with a "processing system" that includes one or more processors. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise.

Accordingly, in one or more aspects, the functions described may be implemented in hardware, software, firmware, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes compact disc (CD), laser disc, optical disc, digital versatile disc (DVD), and floppy disk where disks usually reproduce data magnetically, while discs reproduce data optically with lasers. Combinations of the above should also be included within the scope of computer-readable media.

Described herein are various aspects related to communicating in a wireless network according to an uplink frame structure that is based on a transmission time interval (TTI) having a duration less than a subframe (e.g., one symbol, two symbols, a subframe slot, etc.), which is referred to herein as ultra low latency (ULL) communications. In this regard, a lower latency in communications is achieved by the shorter, more frequent TTI. For example, where LTE has a 1 millisecond (ms) subframe TTI duration, instead the present aspects may utilize a symbol duration that can achieve a latency that is around 14 times lower than LTE for normal cyclic prefix (CP), and around 12 times lower than LTE for extended CP. In addition, latency related to hybrid automatic repeat/request (HARQ) processes and scheduling are accordingly reduced as well.

In one example, the frame structure for ULL can be designed to co-exist with LTE communications (e.g., at least at a evolved Node B (eNB)). Accordingly, for example, the frame structure for ULL can be defined within an LTE frequency band, and within a data portion (e.g., excluding a control portion of LTE). Moreover, at least a portion of the LTE data portion, in this regard, can be divided into control and data communications for ULL, which can further be divided into one or more resource blocks (RB) groups each comprising a plurality of RBs. Thus, a control and data region may be similarly defined over the RB groups for ULL communications. The control channel for ULL can be referred to herein as ULL PUCCH (uPUCCH, and also referred to herein as vPUCCH), and the data channel for ULL can be referred to herein as ULL PUSCH (uPUSCH, and also referred to herein as vPUSCH). Moreover, a region for transmission of ULL reference signals (uRS, and also referred to herein as vRS) may also be defined within the LTE data region. In addition, where a UE supports both ULL and LTE in this regard, collision avoidance may be utilized where the UE may be assigned conflicting resources for ULL and LTE communications.

Therefore, the present aspects may be especially useful when the UE transitions between base stations, as the presently described techniques provide lower latency for handover procedures.

Referring first to FIG. 1, a diagram illustrates an example of a wireless communication system 100, in accordance with an aspect of the present disclosure. The wireless communication system 100 includes a plurality of access points (e.g., base stations, eNBs, or WLAN access points) 155, a number of user equipment (UEs) 115, and a core network 130.

When UE 115 is in communication with a source base station 105-*a* but in the process of, for example, being handed over to a target base station 105, target base station 105 may be configured to estimate timing information, e.g., timing advance (TA), for UE 115 based at least in part on reference signal information associated with UE 115. The reference signal information, e.g., sounding reference signal (SRS), may be provided by UE 115 and tracked or monitored by target base station 105 based on a reference signal configuration received by target base station 105 from source base station 105-*a* before or as part of a handover preparation operation between source base station 105-*a* and target base station 105.

Since the timing information can be calculated and provided to UE 115 at a radio resource control (RRC) reconfiguration message, the transmission of the timing information over PRACH may no longer be necessary. As such, latency caused by the transmission over PRACH can be eliminated and the handover procedure may be expedited.

Access points 155 may communicate control information and/or user data with the core network 130 through backhaul links 132. Access points 155 may include target base station 105 and source base station 105-*a*. In examples, the access points 155 may communicate, either directly or indirectly, with each other over backhaul links 134, which may be wired or wireless communication links. The wireless communication system 100 may support operation on multiple carriers (waveform signals of different frequencies). Multi-carrier transmitters can transmit modulated signals simultaneously on the multiple carriers. For example, each communication link 125 may be a multi-carrier signal modulated according to the various radio technologies described above. Each modulated signal may be sent on a different carrier and may carry control information (e.g., reference signals, control channels, etc.), overhead information, data, etc.

In some examples, at least a portion of the wireless communication system 100 may be configured to operate on multiple hierarchical layers in which one or more of the UEs 115 and one or more of the access points 155 may be configured to support transmissions on a hierarchical layer that has a reduced latency with respect to another hierarchical layer. In some examples a hybrid UE 115-*a* may communicate with source base station 105-*a* on both a first hierarchical layer that supports first layer transmissions with a first subframe type and a second hierarchical layer that supports second layer transmissions with a second subframe type. For example, source base station 105-*a* may transmit subframes of the second subframe type that are time division duplexed with subframes of the first subframe type.

In some examples, hybrid UE 115-*a* may acknowledge receipt of a transmission by providing acknowledgement (ACK)/non-acknowledgement (NACK) for the transmission through, for example, a HARQ scheme. Acknowledgments from hybrid UE 115-*a* for transmissions in the first hierarchical layer may be provided, in some examples, after a predefined number of subframes following the subframe in which the transmission was received. The hybrid UE 115-*a*, when operating in the second hierarchical layer may, in examples, acknowledge receipt in a same subframe as the subframe in which the transmission was received. The time required to transmit an ACK/NACK and receive a retransmission may be referred to as round trip time (RTT), and thus subframes of the second subframe type may have a second RTT that is shorter than a RTT for subframes of the first subframe type.

In other examples, a second layer UE 115-*b* may communicate with base station 105-*b* on the second hierarchical layer only. Thus, hybrid UE 115-*a* and second layer UE 115-*b* may belong to a second class of UEs 115 that may communicate on the second hierarchical layer, while legacy UEs 115 may belong to a first class of UEs 115 that may communicate on the first hierarchical layer only. Base station 105-*b* and UE 115-*b* may communicate on the second hierarchical layer through transmissions of subframes of the second subframe type. Base station 105-*b* may transmit subframes of the second subframe type exclusively, or may transmit one or more subframes of the first subframe type on the first hierarchical layer that are time division multiplexed with subframes of the second subframe type. Second layer UE 115-*b*, in the event that base station 105-*b* transmits subframes of the first subframe type, may ignore such subframes of the first subframe type. Thus, second layer UE 115-*b* may acknowledge receipt of transmissions in a same subframe as the subframe in which the transmissions are received. Thus, second layer UE 115-*b* may operate with reduced latency compared to UEs 115 that operate on the first hierarchical layer.

The access points 155 may wirelessly communicate with the UEs 115 via one or more access point antennas. Each of the access points 155 sites may provide communication coverage for a respective coverage area 110. In some examples, access points 155 may be referred to as a base transceiver station, a radio base station, a radio transceiver, a basic service set (BSS), an extended service set (ESS), a NodeB, eNodeB, Home NodeB, a Home eNodeB, or some other suitable terminology. The coverage area 110 for a base station may be divided into sectors making up only a portion of the coverage area (not shown). The wireless communication system 100 may include access points 155 of different types (e.g., macro, micro, and/or pico base stations). The access points 155 may also utilize different radio technologies, such as cellular and/or WLAN radio access technologies (RAT). The access points 155 may be associated with the same or different access networks or operator deployments. The coverage areas of different access points 155, including the coverage areas of the same or different types of access points 155, utilizing the same or different radio technologies, and/or belonging to the same or different access networks, may overlap.

In LTE/LTE-A and/or ULL LTE network communication systems, the terms evolved Node B (eNodeB or eNB) may be generally used to describe the access points 155. The wireless communication system 100 may be a Heterogeneous LTE/LTE-A/ULL LTE network in which different types of access points provide coverage for various geographical regions. For example, each access point 155 may provide communication coverage for a macro cell, a pico cell, a femto cell, and/or other types of cell. Small cells such as pico cells, femto cells, and/or other types of cells may include low power nodes or LPNs. A macro cell generally covers a relatively large geographic area (e.g., several kilometers in radius) and may allow unrestricted access by UEs 115 with service subscriptions with the network provider. A small cell would generally cover a relatively smaller geographic area and may allow unrestricted access by UEs 115 with service subscriptions with the network provider, for example, and in addition to unrestricted access, may also provide restricted access by UEs 115 having an association with the small cell (e.g., UEs in a closed subscriber group (CSG), UEs for users in the home, and the like). An eNB for a macro cell may be referred to as a macro eNB. An eNB for a small cell may be referred to as a small cell eNB. An eNB may support one or multiple (e.g., two, three, four, and the like) cells.

The core network 130 may communicate with the eNBs or other access points 155 via a backhaul link 132 (e.g., S1 interface, etc.). The access points 155 may also communicate with one another, e.g., directly or indirectly via backhaul links 134 (e.g., X2 interface, etc.) and/or via backhaul links 132 (e.g., through core network 130). The wireless communication system 100 may support synchronous or asynchronous operation. For synchronous operation, the access points 155 may have similar frame timing, and transmissions from different access points 155 may be approximately aligned in time. For asynchronous operation, the access points 155 may have different frame timing, and transmissions from different access points 155 may not be aligned in time. Furthermore, transmissions in the first hierarchical layer and second hierarchical layer may or may not be synchronized among access points 155. The techniques described herein may be used for either synchronous or asynchronous operations.

The UEs 115 are dispersed throughout the wireless communication system 100, and each UE 115 may be stationary or mobile. A UE 115 may also be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. A UE 115 may be a cellular phone, a personal digital assistant (PDA), a wireless modem, a wireless communication device, a handheld device, a tablet computer, a laptop computer, a cordless phone, a wearable item such as a watch or glasses, a wireless local loop (WLL) station, or the like. A UE 115 may be able to communicate with macro eNodeBs, small cell eNodeBs, relays, and the like. A UE 115 may also be able to communicate over different access networks, such as cellular or other WWAN access networks, or WLAN access networks.

The communication links 125 shown in wireless communication system 100 may include uplink (UL) transmissions from a UE 115 to a target base station 105, and/or downlink (DL) transmissions, from an target base station 105 to a UE 115. The downlink transmissions may also be called forward link transmissions while the uplink transmissions may also be called reverse link transmissions. The communication links 125 may carry transmissions of each hierarchical layer which, in some examples, may be multiplexed in the communication links 125. The UEs 115 may be configured to collaboratively communicate with multiple access points 155 through, for example, Multiple Input Multiple Output (MIMO), carrier aggregation (CA), Coordinated Multi-Point (CoMP), or other schemes. MIMO techniques use multiple antennas on the access points 155 and/or multiple antennas on the UEs 115 to transmit multiple data streams. Carrier aggregation may utilize two or more component carriers on a same or different serving cell for data transmission. CoMP may include techniques for coordination of transmission and reception by a number of access points 155 to improve overall transmission quality for UEs 115 as well as increasing network and spectrum utilization.

As mentioned, in some examples access points 155 and UEs 115 may utilize carrier aggregation to transmit on multiple carriers. In some examples, access points 155 and UEs 115 may concurrently transmit in a first hierarchical layer, within a frame, one or more subframes each having a first subframe type using two or more separate carriers. Each carrier may have a bandwidth of, for example, 20 MHz, although other bandwidths may be utilized. Hybrid UE 115-$a$, and/or second layer UE 115-$b$ may, in certain examples, receive and/or transmit one or more subframes in a second hierarchical layer utilizing a single carrier that has a bandwidth greater than a bandwidth of one or more of the separate carriers. For example, if four separate 20 MHz carriers are used in a carrier aggregation scheme in the first hierarchical layer, a single 80 MHz carrier may be used in the second hierarchical layer. The 80 MHz carrier may occupy a portion of the radio frequency spectrum that at least partially overlaps the radio frequency spectrum used by one or more of the four 20 MHz carriers. In some examples, scalable bandwidth for the second hierarchical layer type may be combined techniques to provide shorter RTTs such as described above, to provide further enhanced data rates.

Each of the different operating modes that may be employed by wireless communication system 100 may operate according to frequency division duplexing (FDD) or time division duplexing (TDD). In some examples, different hierarchical layers may operate according to different TDD or FDD modes. For example, a first hierarchical layer may operate according to FDD while a second hierarchical layer may operate according to TDD. In some examples, OFDMA communications signals may be used in the communication links 125 for LTE downlink transmissions for each hierarchical layer, while single carrier frequency division multiple access (SC-FDMA) communications signals may be used in the communication links 125 for LTE uplink transmissions in each hierarchical layer. Additional details regarding implementation of hierarchical layers in a system such as the wireless communication system 100, as well as other features and functions related to communications in such systems, are provided below with reference to the following figures.

In an aspect, UE 115 may be configured to transmit reference signal information to source base station 105-$a$ in accordance with a reference signal configuration determined by a handover manager 111 and/or reference signal configuration component 750 included in source base station 105-$a$. The reference signal information, e.g., sounding reference signal (SRS), may include or be associated with one or more measurement reports that indicate a channel quality of an uplink path of UE 115. The reference signal configuration may at least include information indicating how UE 115 may transmit the reference signal information. As such, source base station 105-a may be able to monitor the reference signal information based on the reference signal configuration.

Further, source base station 105-a may transmit the reference signal configuration to target base station 105. A handover manager 112 of target base station 105 may then track or monitor the reference signal information transmitted by UE 115 based on the received reference signal configuration. With the reference signal information, handover manager 112 may estimate timing information, e.g., timing advance (TA), for UE 115. In an aspect, the timing information may refer to a timing offset to compensate for propagation delay influenced by the distance between UE 115 and target base station 105.

The estimated timing information may then be transmitted from target base station 105 to source base station 105-a during a handover preparation procedure. As referenced herein, the handover preparation procedure may include one or more operations to prepare to hand over UE 115 from source base station 105-a to target base station 105. In some additional examples, source base station 105-a and target base station 105 may negotiate physical uplink shared channel (PUSCH) resources during the handover preparation procedure. The timing information may be further transmitted in a RRC reconfiguration message from source base station 105-a to UE 115. The RRC reconfiguration message may also include the negotiated PUSCH resources assigned for UE 115.

In some aspects, upon receiving the RRC reconfiguration message, UE 115 may first interpret the RRC reconfiguration message to obtain the timing information and then may tune to target base station 105 and start transmission to the target base station 105 utilizing the assigned PUSCH resources in a semi-persistent manner, e.g., semi-persistent scheduling (SPS). The transmission may be adjusted based on the timing information included in the RRC reconfiguration message. As such, a PRACH transmission may not be necessary and the overall handover procedure may be expedited. In some examples, the total delay may be reduced from 30 milliseconds to 10 milliseconds.

Further, in some non-limiting examples, the transmission from UE 115 to target base station 105 may include Msg. 3 in Rel. 8, e.g., Cell Radio Network Temporary Identifier (C-RNTI), buffer state report (BSR), etc. In some aspects alternative to the semi-persistent manner, UE 115 may be assigned with uplink resources for a single subframe.

In some other aspects, after the RRC reconfiguration message is received, UE 115 may not tune to target base station 105 immediately but wait until uplink resources are assigned by source base station 105-a for target base station 105. A special indication in downlink control information (DCI) may be included to indicate that the assigned resources are for target base station 105, rather than source base station 105-a.

Figure 2:
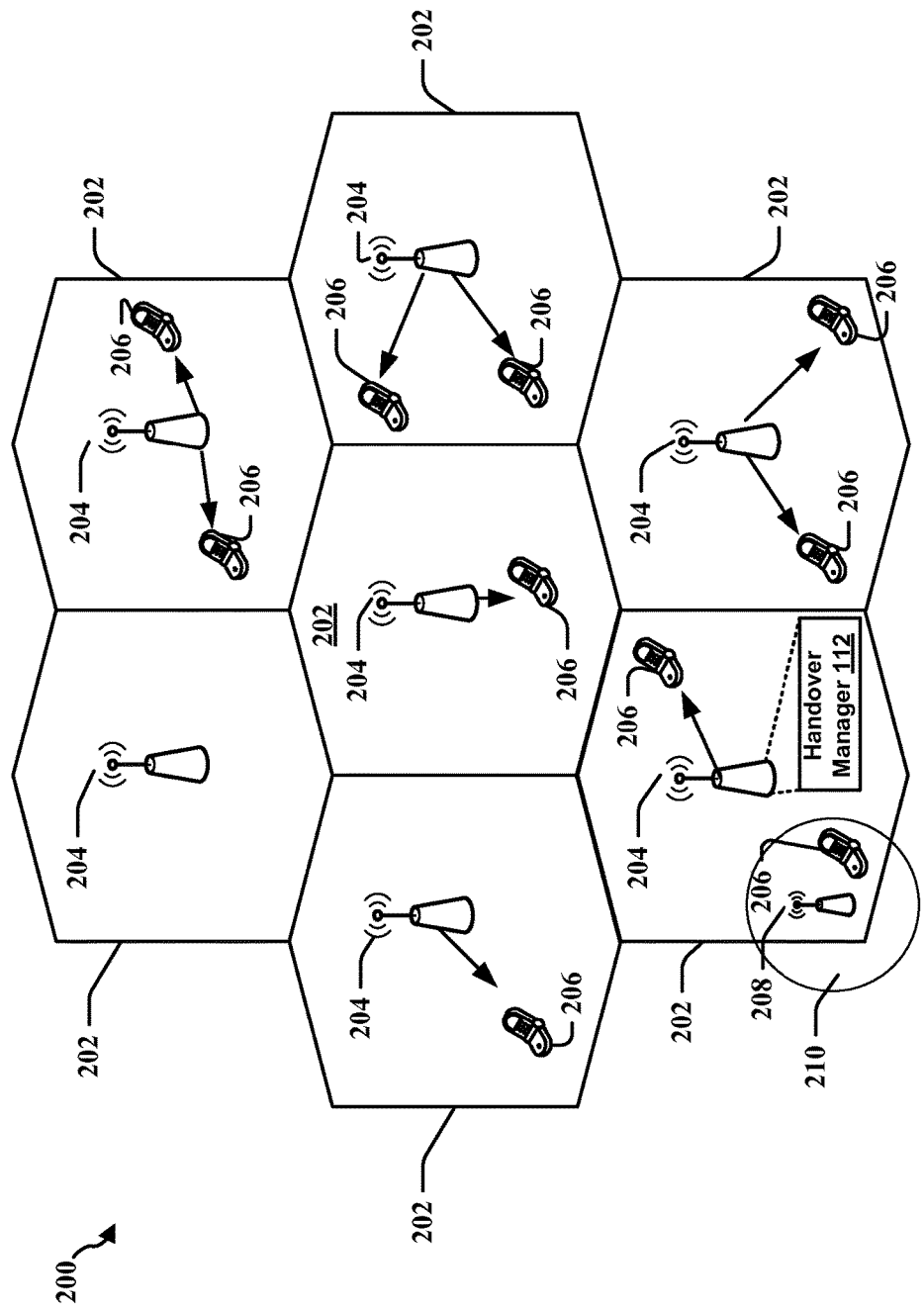
FIG. 2 is a block diagram illustrating an example of an access network having aspects for handover procedure management.

FIG. 2 is a diagram illustrating an example of an access network 200 in an LTE or ULL LTE network architecture. In this example, the access network 200 is divided into a number of cellular regions (cells) 202. One or more lower power class eNBs 208 may have cellular regions 210 that overlap with one or more of the cells 202. The lower power class eNB 208 may be a femto cell (e.g., home eNB (HeNB)), pico cell, micro cell, or remote radio head (RRH). The macro eNBs 204 are each assigned to a respective cell 202 and are configured to provide an access point for all the UEs 206 in the cells 202. In an aspect, eNBs 204 may include a handover manager 112 configured for handover management. There is no centralized controller in this example of an access network 200, but a centralized controller may be used in alternative configurations. The eNBs 204 are responsible for all radio related functions including radio bearer control, admission control, mobility control, scheduling, security, and connectivity to a serving gateway.

The modulation and multiple access scheme employed by the access network 200 may vary depending on the particular telecommunications standard being deployed. In LTE or ULL LTE applications, OFDM may be used on the DL and SC-FDMA may be used on the UL to support both frequency division duplexing (FDD) and time division duplexing (TDD). As those skilled in the art will readily appreciate from the detailed description to follow, the various concepts presented herein are well suited for LTE applications. However, these concepts may be readily extended to other telecommunication standards employing other modulation and multiple access techniques. By way of example, these concepts may be extended to Evolution-Data Optimized (EV-DO) or Ultra Mobile Broadband (UMB). EV-DO and UMB are air interface standards promulgated by the 3rd Generation Partnership Project 2 (3GPP2) as part of the CDMA2000 family of standards and employs CDMA to provide broadband Internet access to mobile stations. These concepts may also be extended to Universal Terrestrial Radio Access (UTRA) employing Wideband-CDMA (W-CDMA) and other variants of CDMA, such as TD-SCDMA; Global System for Mobile Communications (GSM) employing TDMA; and Evolved UTRA (E-UTRA), IEEE 802.11 (Wi-Fi), IEEE 802.16 (WiMAX), IEEE 802.20, and Flash-OFDM employing OFDMA. UTRA, E-UTRA, UMTS, LTE and GSM are described in documents from the 3GPP organization. CDMA2000 and UMB are described in documents from the 3GPP2 organization. The actual wireless communication standard and the multiple access technology employed will depend on the specific application and the overall design constraints imposed on the system.

The eNBs 204 may have multiple antennas supporting MIMO technology. The use of MIMO technology enables the eNBs 204 to exploit the spatial domain to support spatial multiplexing, beamforming, and transmit diversity. Spatial multiplexing may be used to transmit different streams of data simultaneously on the same frequency. The data steams may be transmitted to a single UE 206 to increase the data rate or to multiple UEs 206 to increase the overall system capacity. This is achieved by spatially precoding each data stream (i.e., applying a scaling of an amplitude and a phase) and then transmitting each spatially precoded stream through multiple transmit antennas on the DL. The spatially precoded data streams arrive at the UE(s) 206 with different spatial signatures, which enables each of the UE(s) 206 to recover the one or more data streams destined for that UE 206. On the UL, each UE 206 transmits a spatially precoded data stream, which enables the eNB 204 to identify the source of each spatially precoded data stream.

Spatial multiplexing is generally used when channel conditions are good. When channel conditions are less favorable, beamforming may be used to focus the transmission energy in one or more directions. This may be achieved by spatially precoding the data for transmission through multiple antennas. To achieve good coverage at the edges of the cell, a single stream beamforming transmission may be used in combination with transmit diversity.

In the detailed description that follows, various aspects of an access network will be described with reference to a MIMO system supporting OFDM on the DL. OFDM is a spread-spectrum technique that modulates data over a number of subcarriers within an OFDM symbol. The subcarriers are spaced apart at precise frequencies. The spacing provides "orthogonality" that enables a receiver to recover the data from the subcarriers. In the time domain, a guard interval (e.g., cyclic prefix) may be added to each OFDM symbol to combat inter-OFDM-symbol interference. The UL may use SC-FDMA in the form of a DFT-spread OFDM signal to compensate for high peak-to-average power ratio (PAPR).

Figure 3:
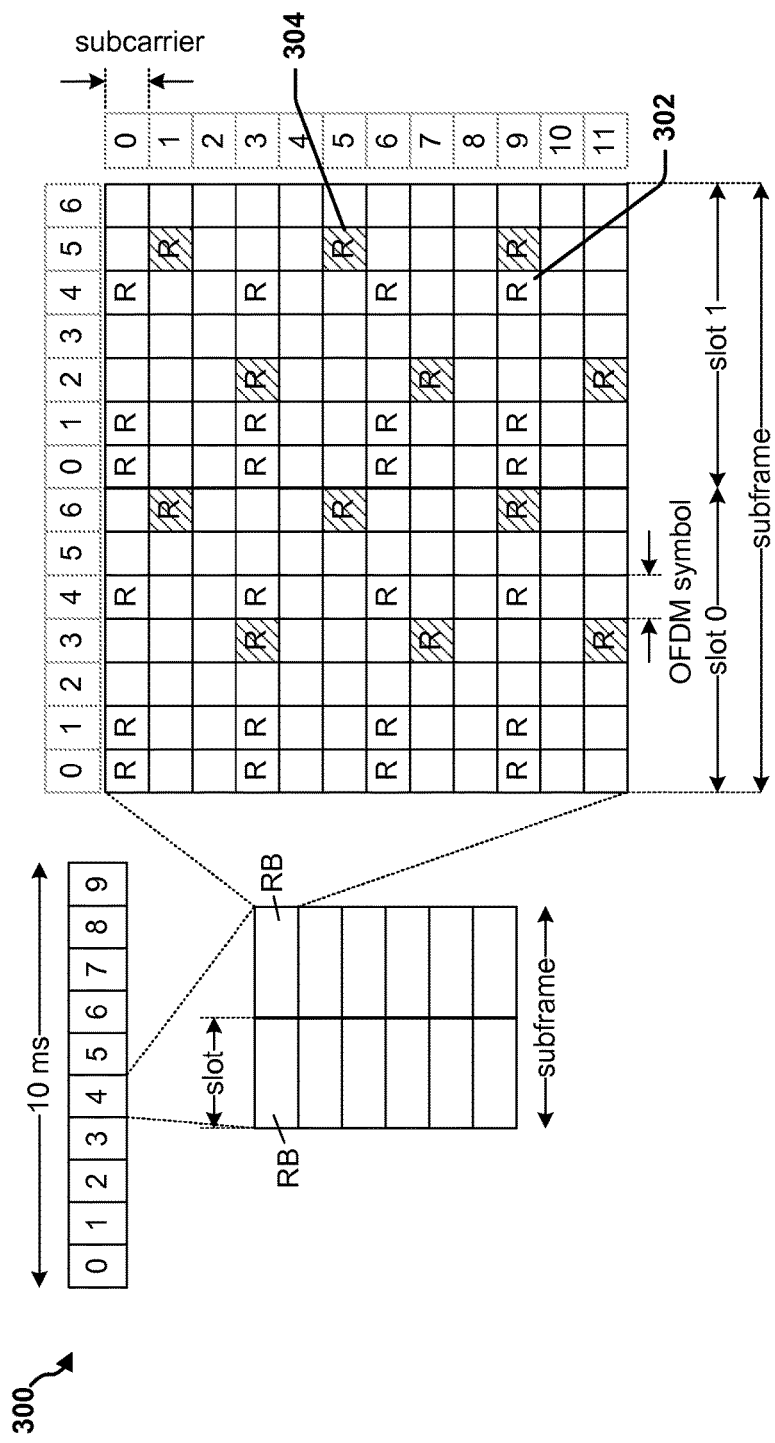
FIG. 3 is a block diagram illustrating a downlink (DL) frame structure in LTE for handover procedure management.

FIG. 3 is a diagram 300 illustrating an example of a DL frame structure in LTE in conjunction with handover procedure management described herein. A frame (10 ms) may be divided into 10 equally sized sub-frames. Each sub-frame may include two consecutive time slots. A resource grid may be used to represent two time slots, each time slot including a resource element block. The resource grid is divided into multiple resource elements. In LTE, a resource element block may contain 12 consecutive subcarriers in the frequency domain and, for a normal cyclic prefix in each OFDM symbol, 7 consecutive OFDM symbols in the time domain, or 84 resource elements. For an extended cyclic prefix, a resource element block may contain 6 consecutive OFDM symbols in the time domain and has 72 resource elements. Some of the resource elements, as indicated as R 302, 304, include DL reference signals (DL-RS). The DL-RS include Cell-specific RS (CRS) (also sometimes called common RS) 302 and UE-specific RS (UE-RS) 304. UE-RS 304 are transmitted only on the resource element blocks upon which the corresponding PDSCH is mapped. The number of bits carried by each resource element depends on the modulation scheme. Thus, the more resource element blocks that a UE receives and the higher the modulation scheme, the higher the data rate for the UE.

Figure 4:
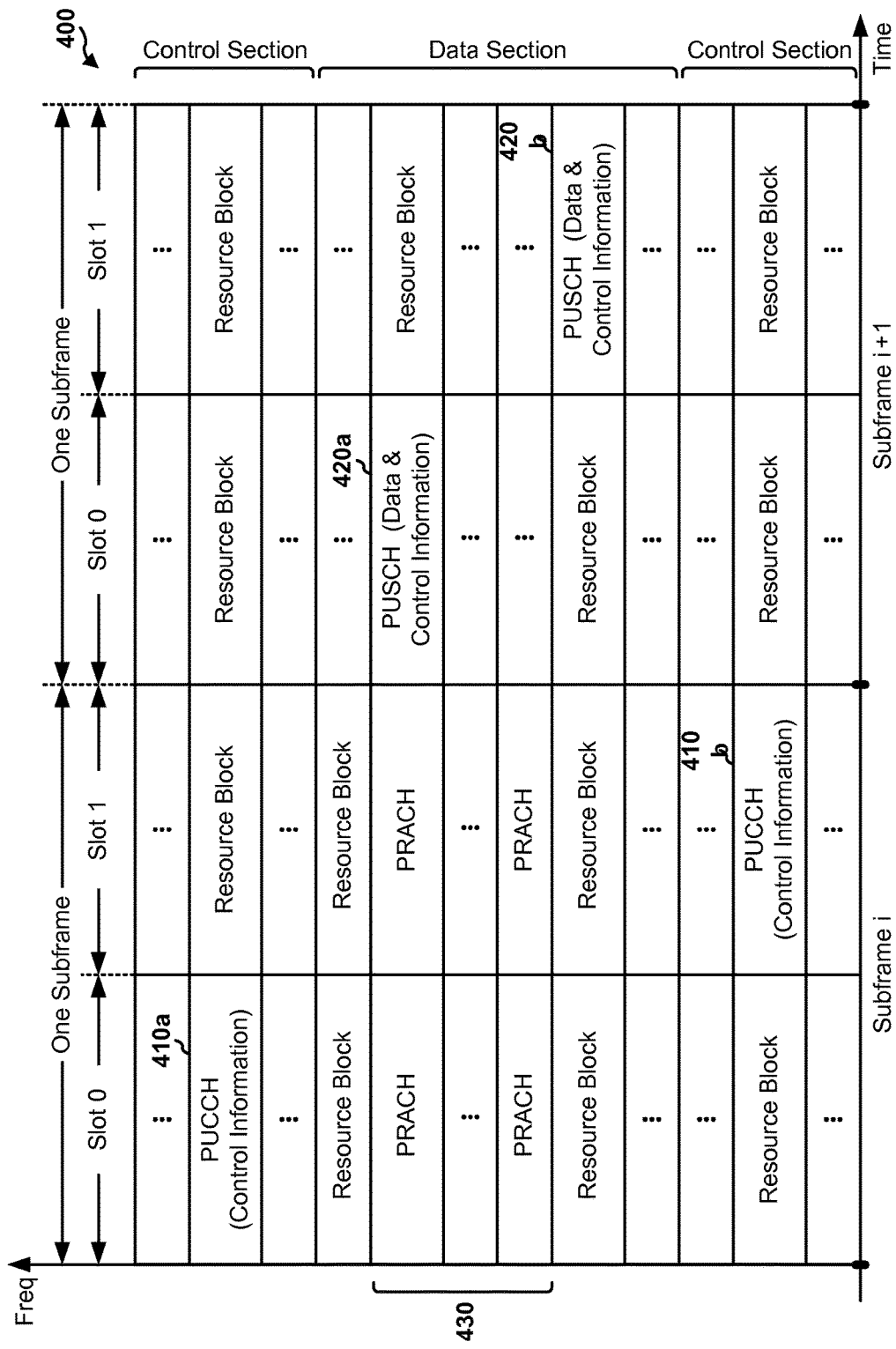
FIG. 4 is a block diagram illustrating a UL frame structure in LTE for handover procedure management.

FIG. 4 is a diagram 400 illustrating an example of an UL frame structure in LTE, which, in some examples, may be utilized in conjunction with handover procedure management described herein. The available resource element blocks for the UL may be partitioned into a data section and a control section. The control section may be formed at the two edges of the system bandwidth and may have a configurable size. The resource element blocks in the control section may be assigned to UEs for transmission of control information. The data section may include all resource element blocks not included in the control section. The UL frame structure results in the data section including contiguous subcarriers, which may allow a single UE to be assigned all of the contiguous subcarriers in the data section.

A UE may be assigned resource element blocks 410a, 410b in the control section to transmit control information to an eNB. The UE may also be assigned resource element blocks 420a, 420b in the data section to transmit data to the eNB. The UE may transmit control information in a physical UL control channel (PUCCH) on the assigned resource element blocks in the control section. The UE may transmit only data or both data and control information in a physical UL shared channel (PUSCH) on the assigned resource element blocks in the data section. A UL transmission may span both slots of a subframe and may hop across frequency.

A set of resource element blocks may be used to perform initial system access and achieve UL synchronization in a physical random access channel (PRACH) 430. The PRACH 430 carries a random sequence and cannot carry any UL data/signaling. Each random access preamble occupies a bandwidth corresponding to six consecutive resource element blocks. The starting frequency is specified by the network. That is, the transmission of the random access preamble is restricted to certain time and frequency resources. There is no frequency hopping for the PRACH. The PRACH attempt is carried in a single subframe (1 ms) or in a sequence of few contiguous subframes and a UE can make only a single PRACH attempt per frame (10 ms).

Figure 5:
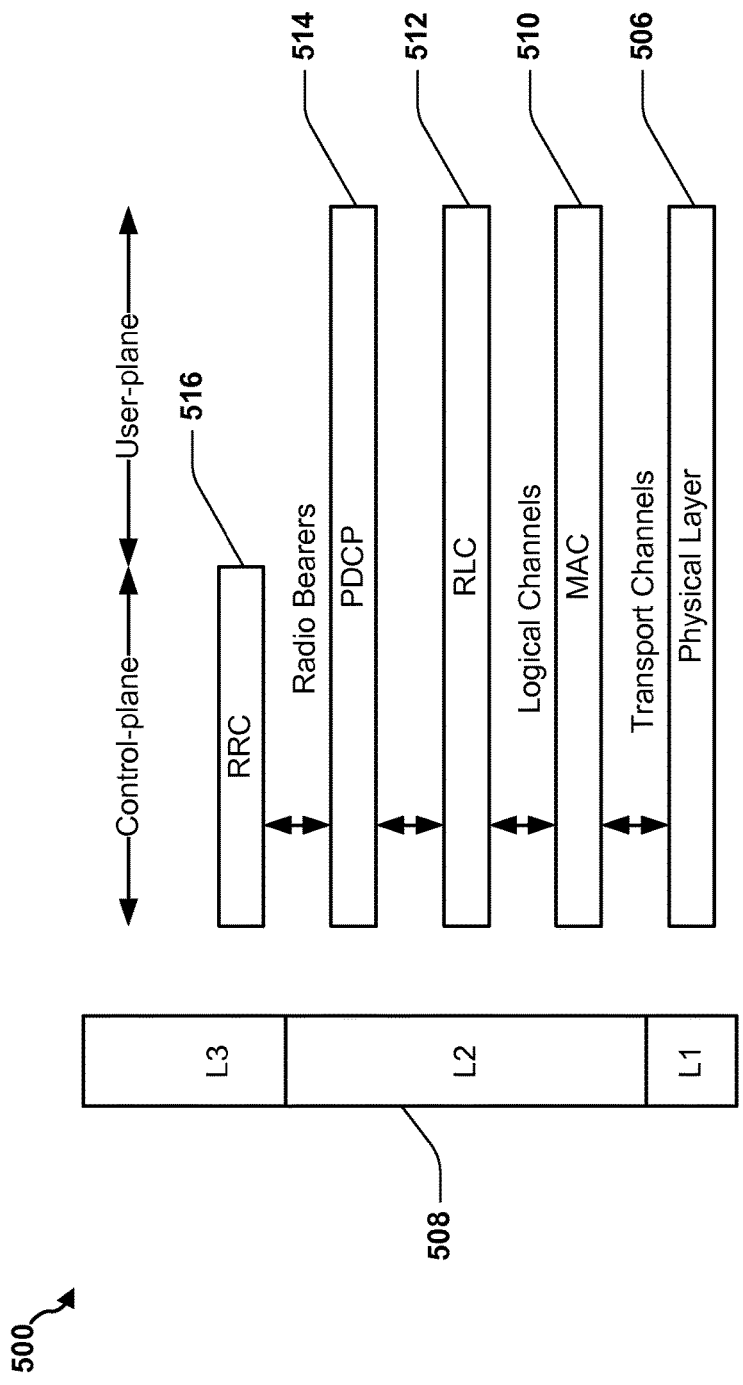
FIG. 5 is a block diagram illustrating an example of a radio protocol architecture for user and control planes for handover procedure management.

FIG. 5 is a diagram 500 illustrating an example of a radio protocol architecture for the user and control planes in LTE and ULL LTE. The radio protocol architecture for the UE and the eNB is shown with three layers: Layer 1, Layer 2, and Layer 3. Layer 1 (L1 layer) is the lowest layer and implements various physical layer signal processing functions. The L1 layer will be referred to herein as the physical layer 506. Layer 2 (L2 layer) 508 is above the physical layer 506 and is responsible for the link between the UE and eNB over the physical layer 506.

In the user plane, the L2 layer 508 includes a media access control (MAC) sublayer 510, a radio link control (RLC) sublayer 512, and a packet data convergence protocol (PDCP) 514 sublayer, which are terminated at the eNB on the network side. Although not shown, the UE may have several upper layers above the L2 layer 508 including a network layer (e.g., IP layer) that is terminated at a PDN gateway on the network side, and an application layer that is terminated at the other end of the connection (e.g., far end UE, server, etc.).

The PDCP sublayer 514 provides multiplexing between different radio bearers and logical channels. The PDCP sublayer 514 also provides header compression for upper layer data packets to reduce radio transmission overhead, security by ciphering the data packets, and handover support for UEs between eNBs. The RLC sublayer 512 provides segmentation and reassembly of upper layer data packets, retransmission of lost data packets, and reordering of data packets to compensate for out-of-order reception due to hybrid automatic repeat request (HARQ). The MAC sublayer 510 provides multiplexing between logical and transport channels. The MAC sublayer 510 is also responsible for allocating the various radio resources (e.g., resource element blocks) in one cell among the UEs. The MAC sublayer 510 is also responsible for HARQ operations.

In the control plane, the radio protocol architecture for the UE and eNB is substantially the same for the physical layer 506 and the L2 layer 508 with the exception that there is no header compression function for the control plane. The control plane also includes a radio resource control (RRC) sublayer 516 in Layer 3 (L3 layer). The RRC sublayer 516 is responsible for obtaining radio resources (i.e., radio bearers) and for configuring the lower layers using RRC signaling between the eNB and the UE.

Figure 6:
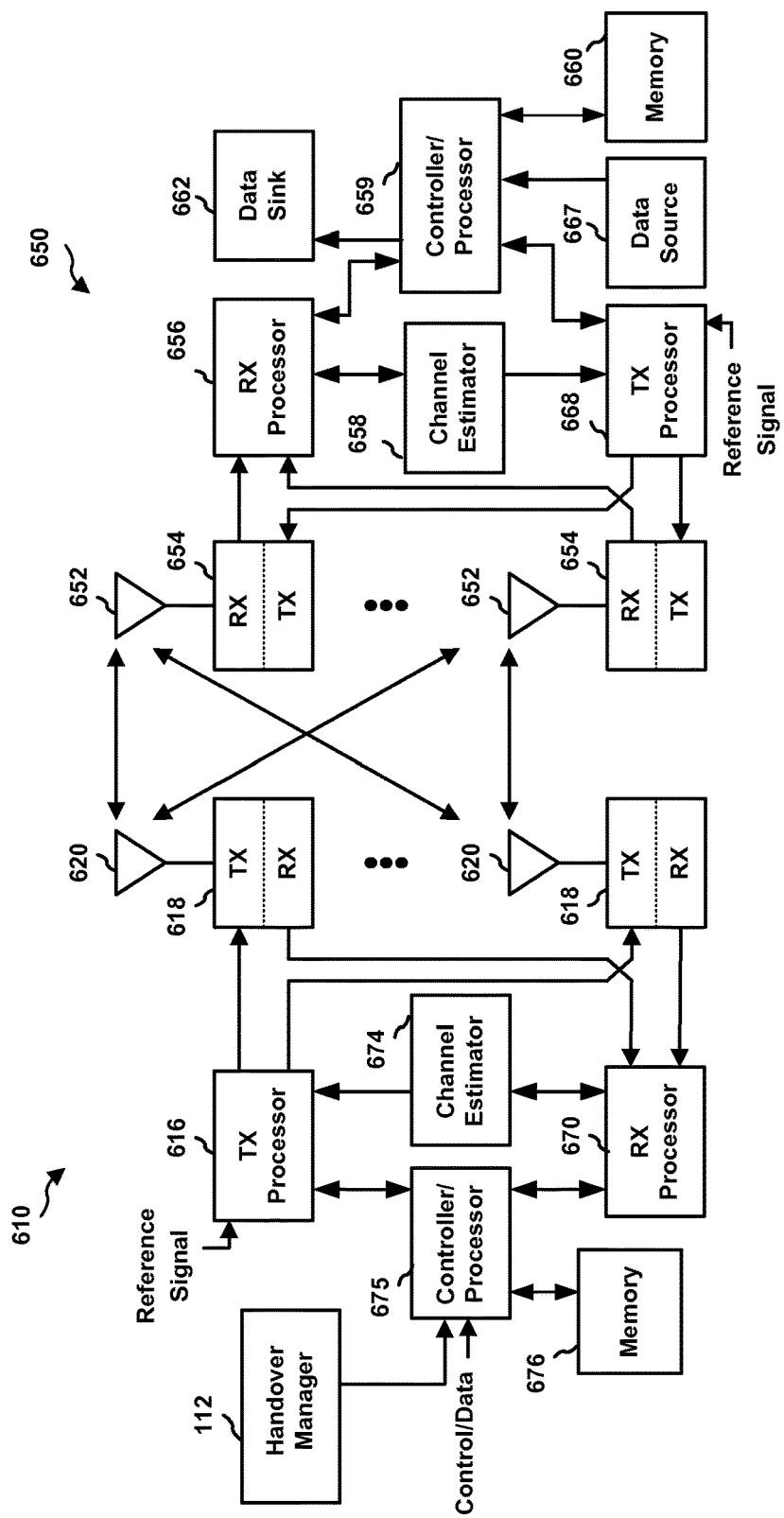
FIG. 6 is a block diagram illustrating an example of an evolved Node B and user equipment in an access network having aspects for handover procedure management.

FIG. 6 is a block diagram of an eNB 610 in communication with a UE 650 in an access network. eNB 610 may be source base station 105-a or target base station 105 having a handover manager 112 and UE 650 may be UE 115 as shown in FIG. 1. In the DL, upper layer packets from the core network are provided to a controller/processor 675. The controller/processor 675 implements the functionality of the L2 layer. In the DL, the controller/processor 675 provides header compression, ciphering, packet segmentation and reordering, multiplexing between logical and transport channels, and radio resource allocations to the UE 650 based on various priority metrics. The controller/processor 675 is also responsible for HARQ operations, retransmission of lost packets, and signaling to the UE 650.

The transmit (TX) processor 616 implements various signal processing functions for the L1 layer (i.e., physical layer). The signal processing functions includes coding and interleaving to facilitate forward error correction (FEC) at the UE 650 and mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols are then split into parallel streams. Each stream is then mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 674 may be used to determine the coding and modulation scheme, as well as for spatial processing. The channel estimate may be derived from a reference signal and/or channel condition feedback transmitted by the UE 650. Each spatial stream is then provided to a different antenna 620 via a separate transmitter 618TX. Each transmitter 618TX modulates an RF carrier with a respective spatial stream for transmission. In addition, eNB 610 may include a handover manager 112 for handover procedure management.

At the UE 650, each receiver 654RX receives a signal through its respective antenna 652. Each receiver 654RX recovers information modulated onto an RF carrier and provides the information to the receive (RX) processor 656. The RX processor 656 implements various signal processing functions of the L1 layer. The RX processor 656 performs spatial processing on the information to recover any spatial streams destined for the UE 650. If multiple spatial streams are destined for the UE 650, they may be combined by the RX processor 656 into a single OFDM symbol stream. The RX processor 656 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, is recovered and demodulated by determining the most likely signal constellation points transmitted by the eNB 610. These soft decisions may be based on channel estimates computed by the channel estimator 658. The soft decisions are then decoded and deinterleaved to recover the data and control signals that were originally transmitted by the eNB 610 on the physical channel. The data and control signals are then provided to the controller/processor 659.

The controller/processor 659 implements the L2 layer. The controller/processor can be associated with a memory 660 that stores program codes and data. The memory 660 may be referred to as a computer-readable medium. In the UL, the controller/processor 659 provides demultiplexing between transport and logical channels, packet reassembly, deciphering, header decompression, control signal processing to recover upper layer packets from the core network. The upper layer packets are then provided to a data sink 662, which represents all the protocol layers above the L2 layer. Various control signals may also be provided to the data sink 662 for L3 processing. The controller/processor 659 is also responsible for error detection using an acknowledgement (ACK) and/or negative acknowledgement (NACK) protocol to support HARQ operations.

In the UL, a data source 667 is used to provide upper layer packets to the controller/processor 659. The data source 667 represents all protocol layers above the L2 layer. Similar to the functionality described in connection with the DL transmission by the eNB 610, the controller/processor 659 implements the L2 layer for the user plane and the control plane by providing header compression, ciphering, packet segmentation and reordering, and multiplexing between logical and transport channels based on radio resource allocations by the eNB 610. The controller/processor 659 is also responsible for HARQ operations, retransmission of lost packets, and signaling to the eNB 610.

Channel estimates derived by a channel estimator 658 from a reference signal or feedback transmitted by the eNB 610 may be used by the TX processor 668 to select the appropriate coding and modulation schemes, and to facilitate spatial processing. The spatial streams generated by the TX processor 668 are provided to different antenna 652 via separate transmitters 654TX. Each transmitter 654TX modulates an RF carrier with a respective spatial stream for transmission.

The UL transmission is processed at the eNB 610 in a manner similar to that described in connection with the receiver function at the UE 650. Each receiver 618RX receives a signal through its respective antenna 620. Each receiver 618RX recovers information modulated onto an RF carrier and provides the information to a RX processor 670. The RX processor 670 may implement the L1 layer.

The controller/processor 675 implements the L2 layer. The controller/processor 675 can be associated with a memory 676 that stores program codes and data. The memory 676 may be referred to as a computer-readable medium. In the UL, the controller/processor 675 provides demultiplexing between transport and logical channels, packet reassembly, deciphering, header decompression, control signal processing to recover upper layer packets from the UE 650. Upper layer packets from the controller/processor 675 may be provided to the core network. The controller/processor 675 is also responsible for error detection using an ACK and/or NACK protocol to support HARQ operations.

Figure 7A:
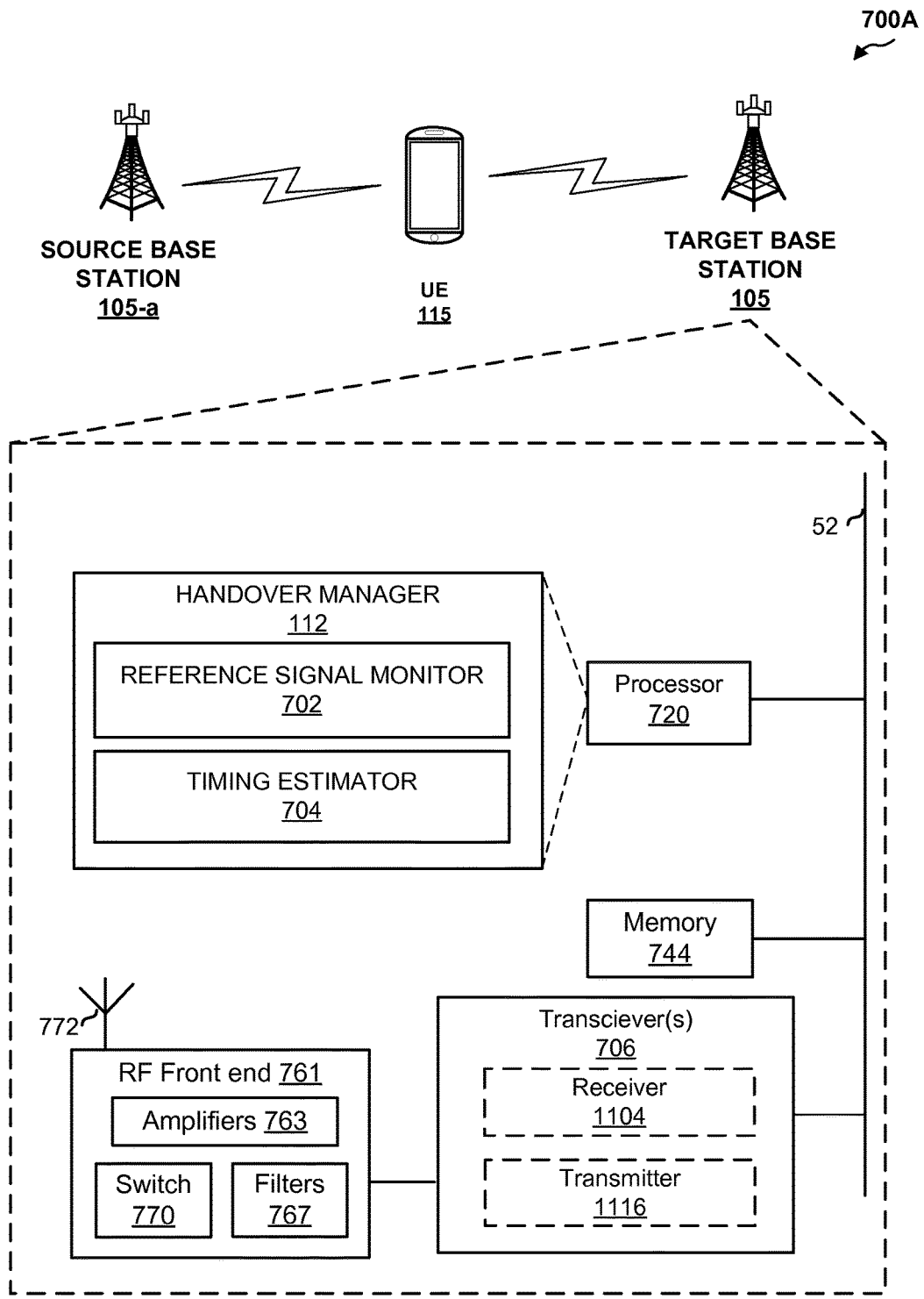
FIG. 7A is a diagram illustrating one or more components at a target base station by which handover procedure management may be implemented.
Figure 11:
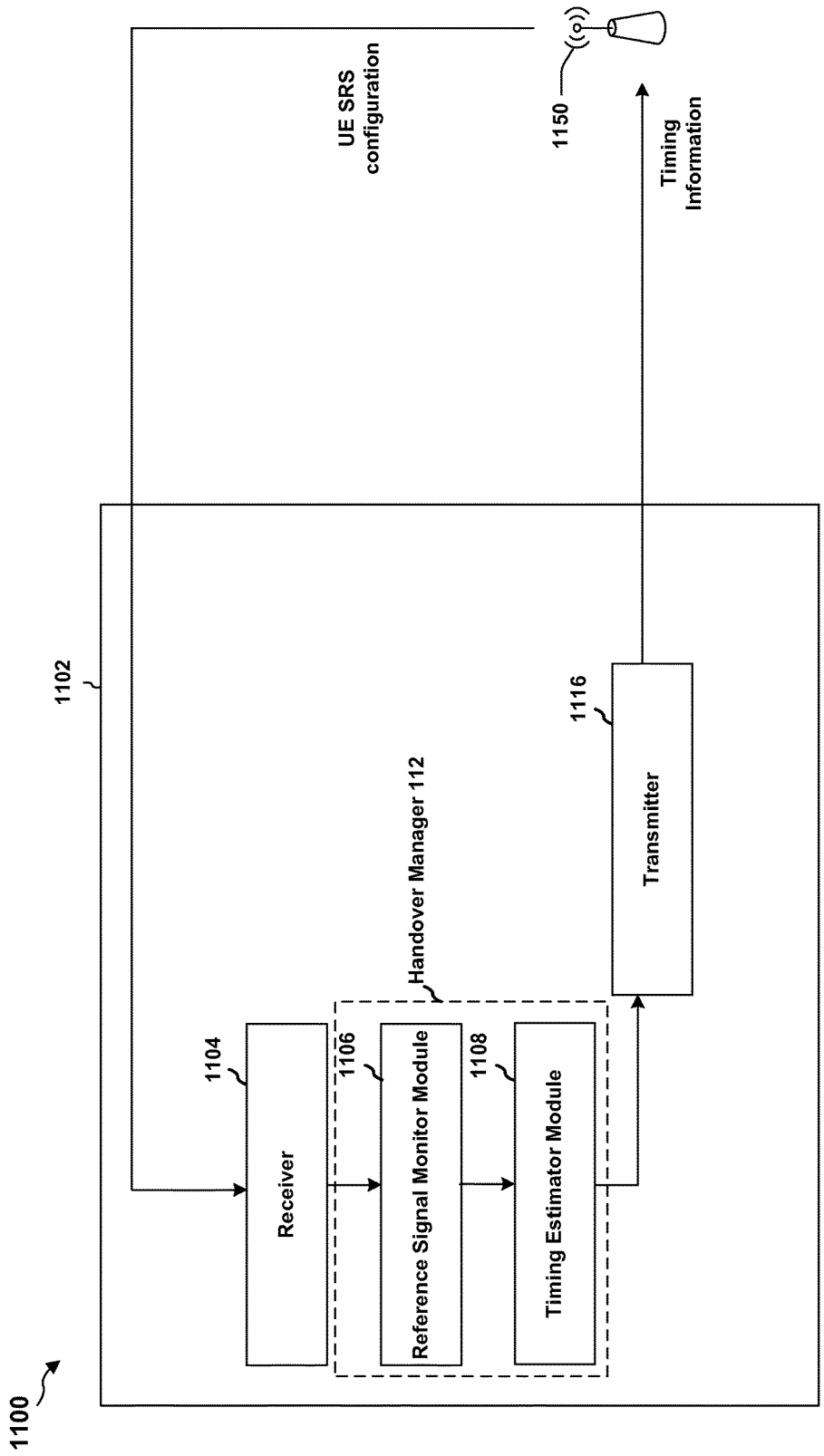
FIG. 11 is a conceptual data flow diagram illustrating the data flow between different modules/means/components in an exemplary apparatus by which handover procedure management may be implemented.

Referring to FIG. 7A, one or more components of target base station 105, by which handover procedure management may be performed, are illustrated in diagram 700A in addition to FIG. 1. The term "component" or "module" as used herein may be one of the parts that make up a system, may be hardware or software, and may be divided into other components or modules. As depicted, handover manager 112 of target base station 105, and of other similar devices, entities, or apparatus as described above, may include a reference signal monitor 702 and a timing estimator 704, each of which may be implemented as software, hardware, firmware, or any combination thereof. Handover manager 112 may be associated with transceiver(s) 706 of target base station 105. In some aspects, transceiver(s) 706 may include receiver 1104 and transmitter 1116 as shown in FIG. 11.

According to the present aspects, target base station 105 may include one or more processors 720 coupled to a memory 744 and transceiver(s) 706. One or more processors 720 may execute various components for managing handover procedure as described herein. For instance, in some aspects, the various components related to handover management may be executed by a single processor, while in other aspects different ones of the components may be executed by a combination of two or more different processors. For example, in an aspect, the one or more processors 720 may include any one or any combination of a modem baseband processor, or a digital signal processor, or a transmit processor, or a transceiver processor. In particular, the one or more processors 720, such as a modem baseband processor, may execute handover manager 112 configured to manage handover procedure.

In the present aspects, handover manager 112, or transceiver(s) 706, may receive a reference signal configuration from source base station 105-a, the reference signal configuration including information indicating how UE 115 may transmit the reference signal information. As reference signals may refer to sounding reference signals (SRS) on uplink, reference signal configurations may refer to configurations of subframes and signature sequences used to transmit the references signals. Based on the reference signal configuration, reference signal monitor 702 may be configured to track or monitor the reference signal information from UE 115 and from other UEs as well.

With the reference signal information, timing estimator 704 may be configured to estimate timing information, e.g., timing advance (TA), for UE 115. For example, timing estimator 704 may be configured to estimate the TA based on the differences in the timing information of the received SRS and the timing information of a cell associated with target base station 105. In an aspect, the timing information may refer to a timing offset to compensate for propagation delay influenced by the distance between UE 115 and target base station 105.

The estimated timing information may then be transmitted by transceiver(s) 706 from target base station 105 to source base station 105-a during a handover preparation procedure. The timing information may be further transmitted in a RRC reconfiguration message from source base station 105-a to UE 115. In some additional examples, transceiver(s) 706 may be configured to negotiate PUSCH resources with source base station 105-a during the handover preparation procedure. That is, transceiver(s) 706 may be configured to determine which PUSCH resources can be used by UE 115 for accessing target base station 105. The RRC reconfiguration message may also include the negotiated PUSCH resources assigned for UE 115.

In some aspects, upon receiving the RRC reconfiguration message, UE 115 may first interpret the RRC reconfiguration message to obtain the timing information and then tune to target base station and start transmission to target base station 105 utilizing the assigned PUSCH resources in a semi-persistent manner, e.g., semi-persistent scheduling (SPS). The transmission may be adjusted based on the timing information included in the RRC reconfiguration message. As such, a PRACH transmission from UE 115 to target base station 105 may not be necessary and the overall handover procedure may be expedited.

Moreover, target base station 105 may include one or more transceiver(s) 706 for receiving and transmitting radio transmissions. For instance, transceiver(s) 706 may be configured to receive different kinds of radio signals, e.g., cellular, WiFi, Bluetooth, GPS, etc. For example, in an aspect, one or more transceiver(s) 706 may be in communication with or connected to a radio frequency (RF) front end 761 defined by, for instance one or more power amplifiers 763, one or more band specific filters 767, and one or more antennas 772. For example, one or more transceiver(s) 706 may include a receiver 1104 and may include hardware and/or software code executable by one or more processors 270 for receiving signals within one or more frequency bands for use in managing handover procedure, e.g. UE SRS configuration 804 (FIG. 8) from source base station 105-a. Additionally, for example, transceiver(s) 706 may also include a transmitter 1116 for transmitting signals to source base station 105-a and/or UE 115, such as UL grant 814.

Figure 7B:
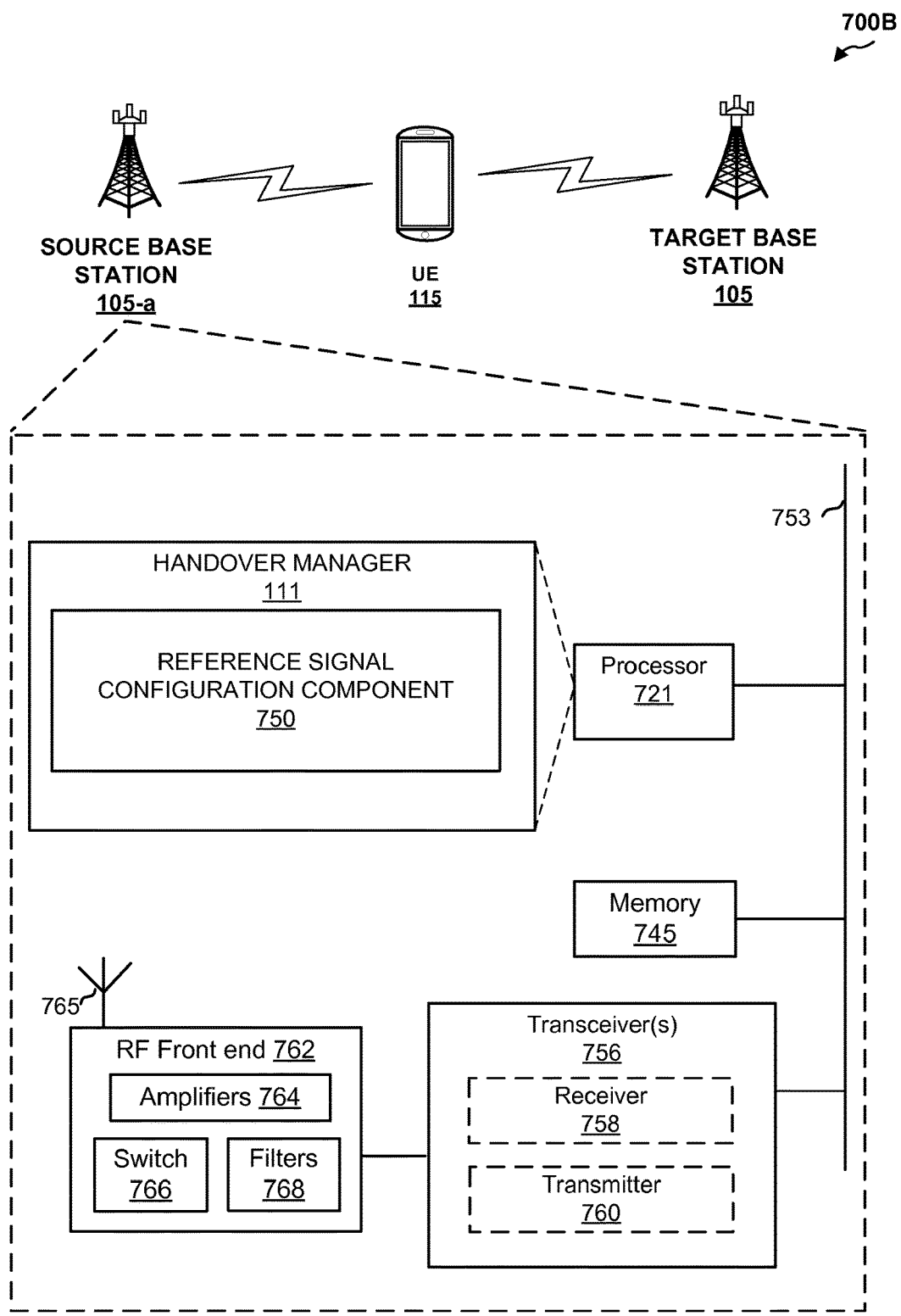
FIG. 7B is a diagram illustrating one or more components at a source base station by which handover procedure management may be implemented.

Referring to FIG. 7B, one or more components of source base station 105-a, by which handover procedure management may be performed, are illustrated in diagram 700B in addition to FIG. 1. As depicted, handover manager 111 of source base station 105-a, and of other similar devices, entities, or apparatus as described above, may include a reference signal configuration component 750, of which may be implemented as software, hardware, firmware, or any combination thereof. Handover manager 111 may be associated with one or more transceiver(s) 756 of source base station 105-a. In some aspects, transceiver(s) 756 may include a receiver 758 and a transmitter 760.

According to the present aspects, source base station 105-a may include one or more processors 721 coupled to a memory 745 and transceiver(s) 756. One or more processors 721 may execute various components for managing handover procedure as described herein. For instance, in some aspects, the various components related to handover management may be executed by a single processor, while in other aspects different ones of the components may be executed by a combination of two or more different processors. For example, in an aspect, the one or more processors 721 may include any one or any combination of a modem baseband processor, or a digital signal processor, or a transmit processor, or a transceiver processor. In particular, the one or more processors 721, such as a modem baseband processor, may execute handover manager 111 configured to manage handover procedure.

In an aspect, handover manager 111, or transceiver(s) 756, may transmit a reference signal configuration of UE 115. As described above, the reference signal configuration may include information indicating how UE 115 may transmit the reference signal information such that target base station 105 and/or components thereof may track or monitor the reference signal information from UE 115 and from other UEs as well.

With the reference signal information, timing estimator 704 of target base station 105 (FIG. 7A) may be configured to estimate timing information, e.g., timing advance (TA), for UE 115. In an aspect, the timing information may refer to a timing offset to compensate for propagation delay influenced by the distance between UE 115 and target base station 105. The estimated timing information may then be transmitted by transceiver(s) 706 from target base station 105 to source base station 105-a during a handover preparation procedure. Handover manager 111, or transceiver(s) 756, may receive the estimated timing information from target base station 105. Handover manager 111, or transceiver(s) 756, may further transmit the timing information in a RRC reconfiguration message from source base station 105-a to UE 115. In some additional examples, transceiver(s) 756 may be configured to negotiate PUSCH resources with target base station 105 during the handover preparation procedure. The RRC reconfiguration message may also include the negotiated PUSCH resources assigned for UE 115.

Moreover, source base station 105-a may include one or more transceiver(s) 756 for receiving and transmitting radio transmissions. For instance, transceiver(s) 756 may be configured to receive different kinds of radio signals, e.g., cellular, WiFi, Bluetooth, GPS, etc. For example, in an aspect, one or more transceiver(s) 756 may be in communication with or connected to a radio frequency (RF) front end 762 defined by, for instance one or more power amplifiers 764, one or more band specific filters 768, and one or more antennas 765. For example, one or more transceiver(s) 756 may include a receiver 758 and may include hardware and/or software code executable by one or more processors 721 for receiving signals within one or more frequency bands for use in managing handover procedure, e.g. messages in handover preparation procedure 808 (FIG. 8) from target base station 105. Additionally, for example, transceiver(s) 756 may also include a transmitter 760 for transmitting signals to target base station 105 and/or UE 115, such as UE SRS configuration 804.

Figure 8:
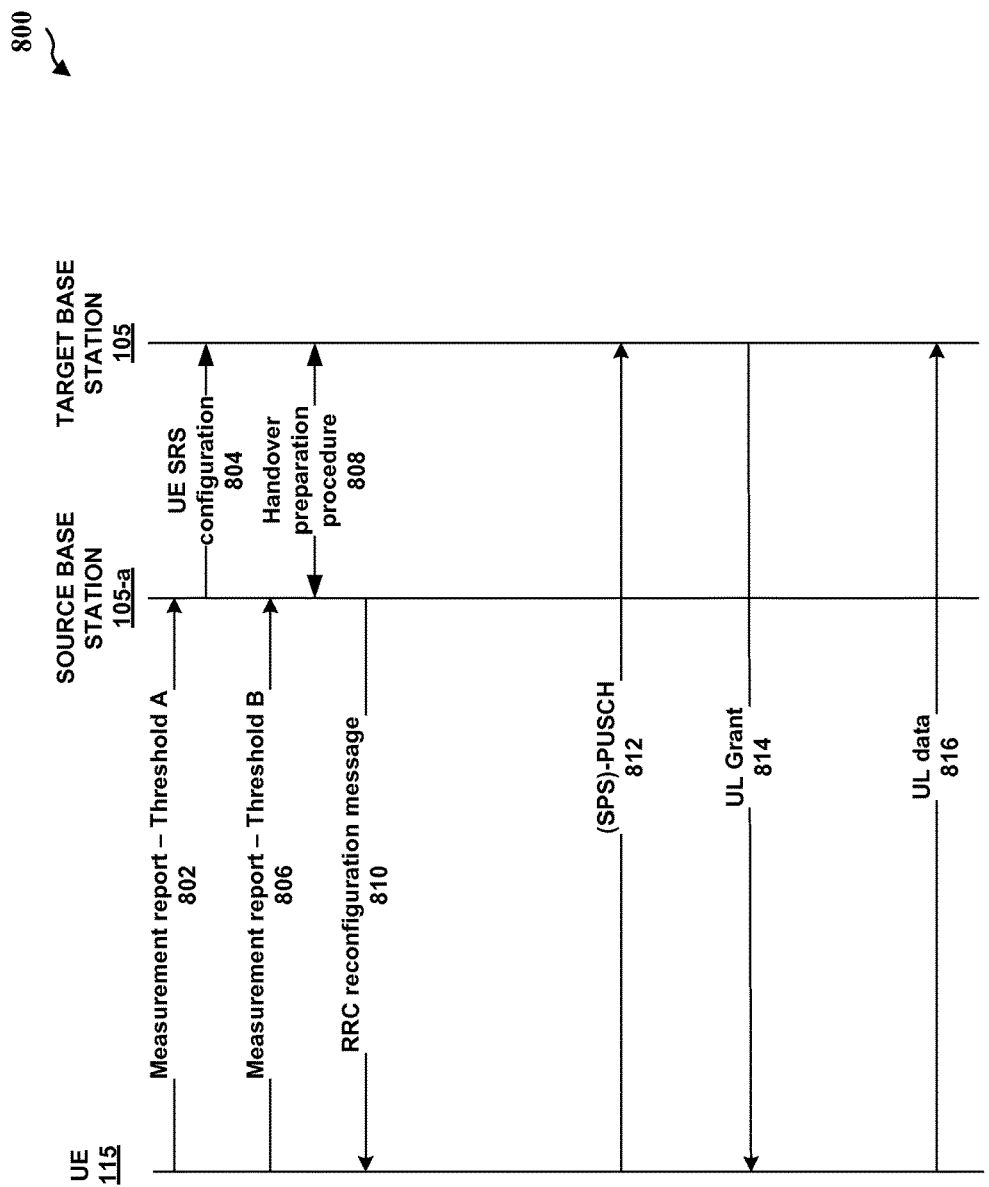
FIG. 8 is an example call flow by which handover procedure management may be implemented.

Referring to FIG. 8, an example call flow 800, by which hand over management may be implemented, is illustrated herein. As depicted, call flow 800 may include multiple interactive operations between UE 115, source base station 105-*a*, and target base station 105.

In an aspect, UE 115 may be configured to transmit measurement reports 802 and 806 (e.g., reference signal received power (RSRP), reference signal received quality (RSRQ), etc.) that respectively include a first threshold and a second threshold to source base station 105-*a*. Source base station 105-*a* may transmit UE SRS configuration 804 to target base station 105. With the information included in UE SRS configuration 804 (e.g., subframe location information, radio bearer location information, signature sequences used), reference signal monitor 702 (FIG. 7A) may track or monitor the reference signal information from UE 115. Based on the reference signal information associated with UE 115, timing estimator 704 (FIG. 7A) of target base station 105 may estimate timing information for UE 115, for example, based on the time difference in when the SRS is received and when the SRS is expected to be received. The timing information for UE 115 may be transmitted, by transceiver(s) 706 (FIG. 7A) of UE 115, to source base station 105-*a* during a handover preparation procedure 808 and may be further transmitted from source base station 105-*a* to UE 115 in an RRC reconfiguration message 810.

Upon receiving RRC reconfiguration message 810, UE 115 may first interpret the RRC reconfiguration message 810 to obtain the timing information and then tune to target base station and start transmission over PUSCH in accordance with SPS, e.g., (SPS)-PUSCH 812. Transceiver(s) 706 may transmit a grant for uplink transmission, e.g., UL grant 814, to UE 115. UE 115 may then start data transmission, e.g., UL data 816, to target base station 105.

In some aspects, the time for interpreting or decoding RRC reconfiguration message 810 may be shortened by tightening the requirement. Further, the delay caused by UE 115 waiting for first available PUSCH resources may be shortened with tight action time for PUSCH assignment or frequent SPS assignment. For example, the total delay of the handover procedure may be up to 30 milliseconds. When the PRACH transmission is no longer necessary, the total delay of the handover procedure may be reduced to 5 to 10 milliseconds.

Figure 9:
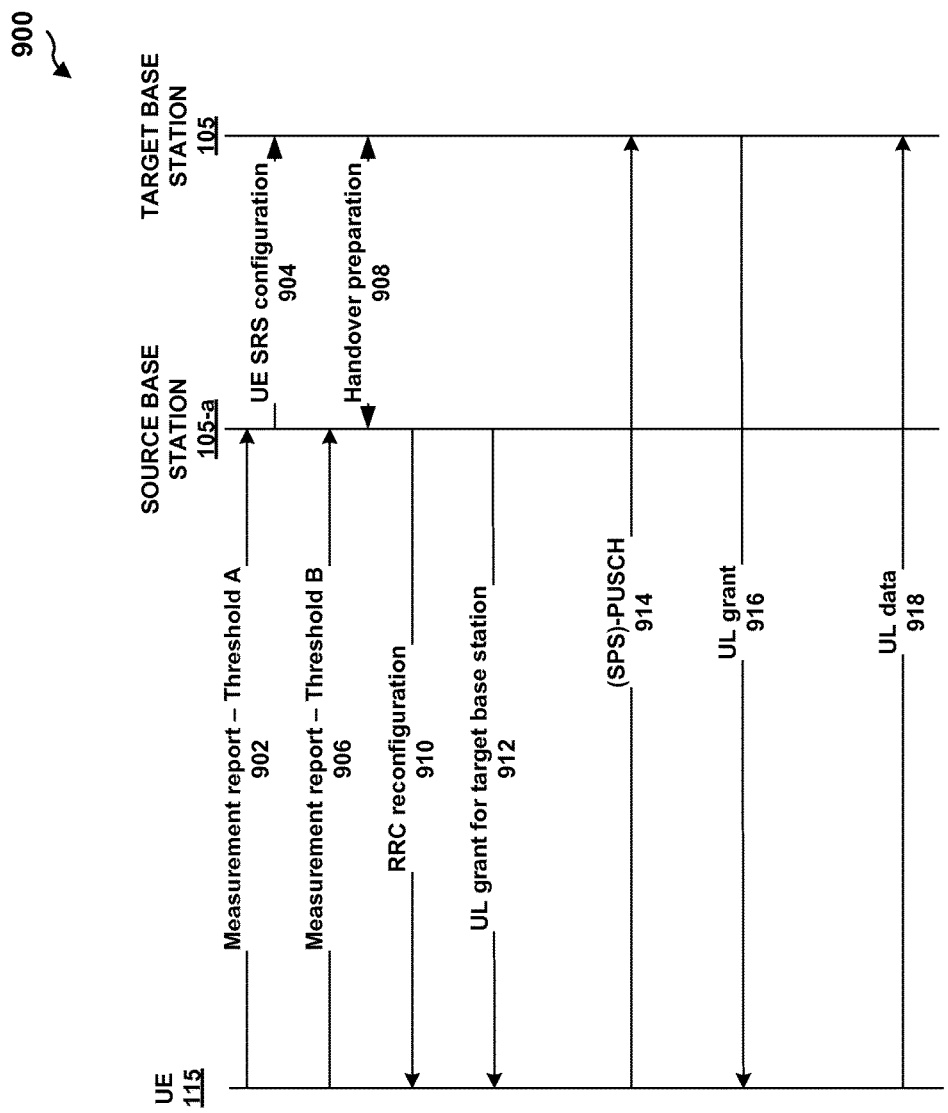
FIG. 9 is another example call flow by which handover procedure management may be implemented.

Referring to FIG. 9, another example call flow 900, by which hand over management may be implemented, is illustrated herein. As depicted, call flow 900 may include multiple interactive operations between UE 115, source base station 105-*a*, and target base station 105.

Similar to call flow 800, UE 115 may be configured to transmit measurement reports 902 and 906 that respectively include the first threshold and the second threshold to source base station 105-*a*. Source base station 105-*a* may transmit UE SRS configuration 904 to target base station 105. With the information included in UE SRS configuration 904, reference signal monitor 702 (FIG. 7A) may track the reference signal information from UE 115. Based on the reference signal information associated with UE 115, timing estimator 704 (FIG. 7A) of target base station 105 may be configured to estimate timing information for UE 115. The timing information for UE 115 may be transmitted, by transceiver(s) 706 (FIG. 7A) associated with handover manager 112, to source base station 105-*a* during a handover preparation procedure 908 and may be further transmitted from source base station 105-*a* to UE 115 in an RRC reconfiguration message 910.

Alternative to call flow 800, source base station 105-*a* may transmit an uplink grant for target base station 912 to UE 115 over physical downlink control channel (PDCCH). UE 115 may tune to target base station and start transmission over PUSCH in accordance with SPS, e.g., (SPS)-PUSCH 914. Transceiver(s) 706 may then transmit a grant for uplink transmission, e.g., UL grant 916, to UE 115. In response to the grant for uplink transmission, UE 115 may then start data transmission, e.g., UL data 918, to target base station 105.

Figure 10A:
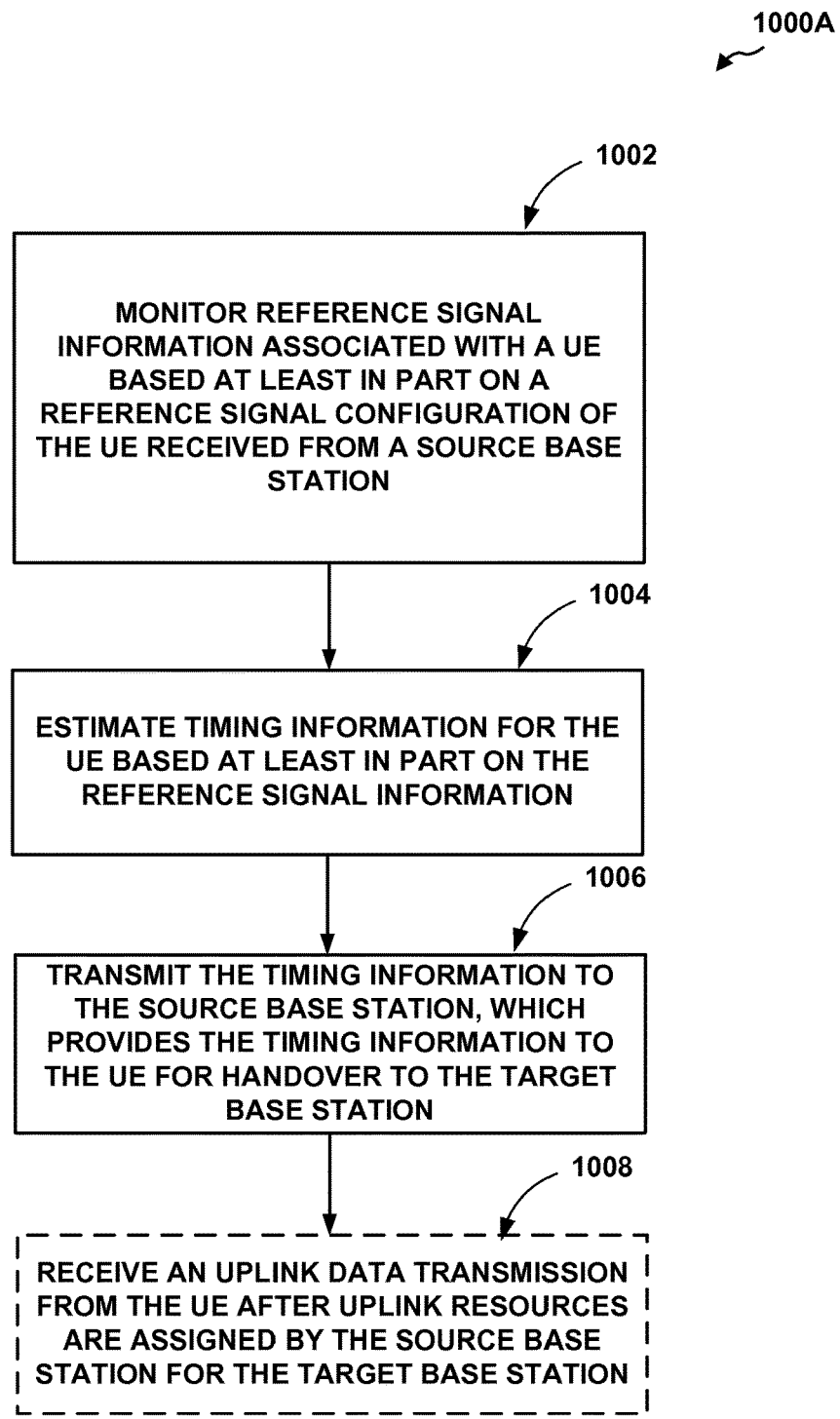
FIG. 10A is a flow chart of aspects of a method for handover procedure management.

Referring to FIG. 10A, aspects of a method 1000A for handover procedure management may be performed by target base station 105 of FIG. 1 and the components thereof. More particularly, aspects of method 1000A may be performed by reference signal monitor 702, timing estimator 704, and transceiver(s) 706 as shown in FIG. 7A. As illustrated in FIG. 10A, dash-lined blocks may indicate optional operations of method 1000.

At 1002, method 1000A includes monitoring reference signal information associated with a UE based at least in part on a reference signal configuration of the UE received from a source base station. For example, when handover manager 112, or transceiver(s) 706 thereof, may receive a reference signal configuration from source base station 105-*a*, reference signal monitor 702 may be configured to track or monitor the reference signal information based on the reference signal configuration.

At 1004, method 1000A includes estimating timing information for the UE based at least in part on the reference signal information. For example, with the reference signal information, timing estimator 704 may be configured to estimate timing information, e.g., timing advance (TA), for UE 115. In an aspect, the timing information may refer to a timing offset to compensate for propagation delay influenced by the distance between UE 115 and target base station 105.

At 1006, method 1000A includes transmitting the timing information to the source base station, wherein the source base station provides the timing information to the UE for handover of the UE to the target base station. For example, the estimated timing information may then be transmitted by transceiver(s) 706 from target base station 105 to source base station 105-*a* during a handover preparation procedure.

At 1008, method 1000A includes receiving an uplink transmission from the UE when uplink resources (e.g., PUSCH resources) are assigned by the source base station for the target base station. For example, transceiver(s) 706 may receive transmission from UE 115 utilizing uplink resources assigned by source base station 105-*a* for target base station 105 in UL grant for target base station 912. In at least some examples, source base station 105-*a* may transmit a resource assignment message that indicates the assigned PUSCH resources to the UE in a form of semi-persistent manner or in a non-regular non-persistent matter where action time is specified when UE 115 transmits on the PUSCH resource to target base station 105. The resource assignment message may be transmitted with MAC signaling.

Figure 10B:
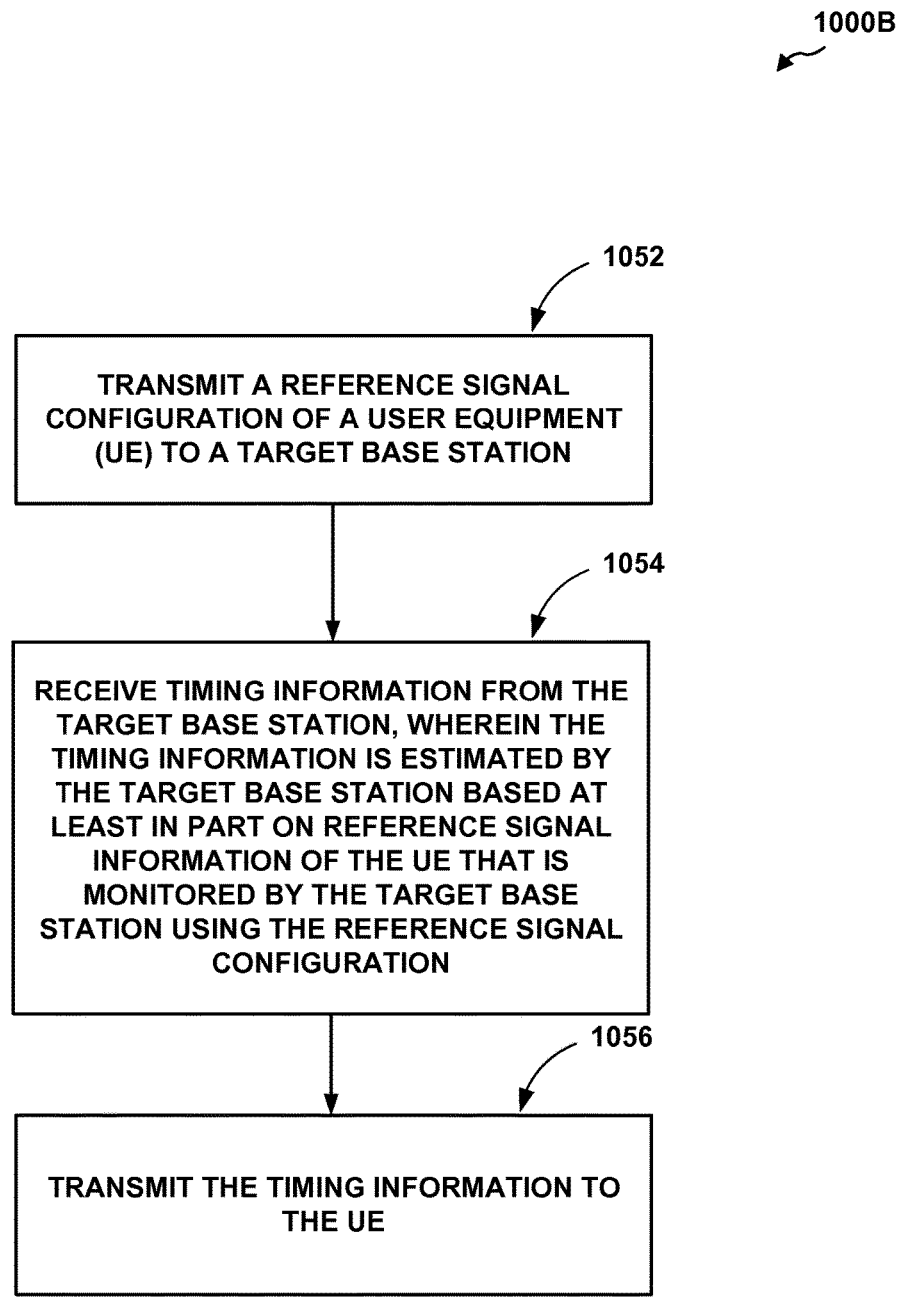
FIG. 10B is a flow chart of aspects of another method for handover procedure management.

Referring to FIG. 10B, aspects of a method 1000B for handover procedure management may be performed by source base station 105-*a* of FIG. 1 and the components thereof. More particularly, aspects of method 1000B may be performed by handover manager 111 including reference signal configuration component 750 and transceiver(s) 756 as shown in FIG. 7B.

At 1052, method 1000B includes transmitting a reference signal configuration of a UE to a target base station. For example, reference signal configuration component 750 may be configured to generate or determine a reference signal configuration of UE 115 based on base station implementations. Transmitter 760 of transceiver(s) 756 may be configured to transmit the reference signal configuration to target base station 105. Based on the reference signal configuration, target base station 105, or components thereof (e.g., reference signal monitor 702 in FIG. 7A), may be configured to monitor the reference signal information. Further, timing estimator 704 (FIG. 7A) of target base station 105 may be configured to estimate timing information for UE 115. The estimated timing information may then be transmitted by transceiver(s) 706 from target base station 105 to source base station 105-a during a handover preparation procedure.

At 1054, method 1000B includes receiving timing information from the target base station, wherein the timing information is estimated by the target base station based at least in part on reference signal information of the UE that is monitored by the target base station using the reference signal configuration. For example, the estimated timing information may be received by transceiver(s) 756 from target base station 105 to source base station 105-a during the handover preparation procedure.

At 1056, method 1000B may include transmitting the timing information to the UE. For example, transmitter 760 of source base station 105-a may be configured to transmit the timing information to UE 115.

FIG. 11 is a conceptual data flow diagram 1100 illustrating the data flow between different modules/means/components in an exemplary apparatus 1102. The apparatus may be a eNB such as target base station 105. The apparatus includes a receiver 1104 that receives UE SRS configuration information, a reference signal monitor module 1106 that monitors reference signal information associated with a UE (e.g., UE 115) based at least in part on a reference signal configuration of the UE received from a source base station, and a timing estimator module 1108 that estimates timing information for the UE based at least in part on the reference signal information. In some aspects, receiver 1104 and transmitter 1116 may be included in transceiver(s) 706 (FIG. 7A). Similarly, reference signal monitor module 1106 and timing estimator module 1108 may be included in handover manager 112 of FIG. 7A.

In an aspect, receiver 1104 may be configured to receive SRS configuration from source base station 105-a and determine how UE 115 transmits the SRS. Based on the SRS configuration, reference signal monitor module 1106 may track or monitor the SRS from UE 115 and transmit relevant information included in the SRS to timing estimator module 1108. Timing estimator module 1108 may estimate the timing information and transmit the timing information to transmitter 1116. The timing information may then be transmitted from transmitter 1116 to source base station 105-a.

The apparatus may include additional modules that perform each of the steps of the algorithm in the aforementioned flow chart of FIG. 10. As such, each step in the aforementioned flow chart of FIG. 10 may be performed by a module and the apparatus may include one or more of those modules. The modules may be one or more hardware components specifically configured to carry out the stated processes/algorithm, implemented by a processor configured to perform the stated processes/algorithm, stored within a computer-readable medium for implementation by a processor, or some combination thereof.

It is understood that the specific order or hierarchy of steps in the processes disclosed is an illustration of exemplary approaches. Based upon design preferences, it is understood that the specific order or hierarchy of steps in the processes may be rearranged. Further, some steps may be combined or omitted. The accompanying method claims present elements of the various steps in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described herein that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed as a means plus function unless the element is expressly recited using the phrase "means for."

Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

What is claimed is:

1. A method for handover operation management by a target base station, comprising:
  receiving a reference signal configuration of a user equipment (UE) from a source base station;
  monitoring reference signal information associated with the UE based at least in part on the reference signal configuration of the UE received from the source base station;
  estimating timing information for the UE based at least in part on the reference signal information;
  transmitting, during a handover preparation operation between the source base station and the target base station, the timing information to the source base station prior to a scheduled physical random access channel (PRACH) procedure, wherein the source base station provides the timing information to the UE to forgo the PRACH procedure and for facilitating handover to the target base station;
  negotiating, with the source base station, physical uplink shared channel (PUSCH) resources during the handover preparation operation; and receiving, on at least one first available PUSCH resource, an uplink data transmission from the UE after uplink resources are assigned by the source base station for the target base station.

2. The method of claim 1, further comprising receiving a message from the UE utilizing PUSCH in a semi-persistent manner after the timing information is received by the UE.

3. The method of claim 1, wherein the timing information is transmitted to the UE in a radio resource control (RRC) reconfiguration message.

4. The method of claim 3, wherein the UE tunes to the target base station after interpreting the RRC reconfiguration message.

5. A non-transitory computer-readable medium storing computer executable code for handover operation between a source base station and a target base station, comprising:
   code for receiving a reference signal configuration of a user equipment (UE) from a source base station;
   code for monitoring reference signal information associated with the UE based at least in part on the reference signal configuration of the UE received from the source base station;
   code for estimating timing information for the UE based at least in part on the reference signal information;
   code for transmitting, during a handover preparation operation between the source base station and the target base station, the timing information to the source base station prior to a scheduled physical random access channel (PRACH) procedure, wherein the source base station provides the timing information to the UE to forgo the PRACH procedure and for facilitating handover to the target base station;
   code for negotiating, with the source base station, physical uplink shared channel (PUSCH) resources during the handover preparation operation; and
   code for receiving, on at least one first available PUSCH resource, an uplink data transmission from the UE after uplink resources are assigned by the source base station for the target base station.

6. The non-transitory computer-readable medium of claim 5, further comprising code for receiving a message from the UE utilizing PUSCH in a semi-persistent manner after the timing information is received by the UE.

7. The non-transitory computer-readable medium of claim 5, wherein the timing information is transmitted to the UE in a radio resource control (RRC) reconfiguration message.

8. The non-transitory computer-readable medium of claim 7, wherein the UE tunes to the target base station after interpreting the RRC reconfiguration message.

9. An apparatus for handover operation between a source base station and a target base station, comprising:
   a transceiver configured to receive reference signal information associated with a user equipment (UE);
   a memory configured to store information; and
   a processor in communication with the memory, the processor and the memory configured to:
     receive a reference signal configuration of a user equipment (UE) from a source base station;
     monitor reference signal information associated with the UE based at least in part on the reference signal configuration of the UE received from the source base station;
     estimate timing information for the UE based at least in part on the reference signal information;
     transmit, during a handover preparation operation between the source base station and the target base station, the timing information to the source base station prior to a scheduled physical random access channel (PRACH) procedure, wherein the source base station provides the timing information to the UE to forgo the PRACH procedure and for facilitating handover to the target base station;
     negotiate, with the source base station, physical uplink shared channel (PUSCH) resources during the handover preparation operation; and
     receive, on at least one first available PUSCH resource, an uplink data transmission from the UE after uplink resources are assigned by the source base station for the target base station.

10. The apparatus of claim 9, wherein the transceiver is further configured to receive a message from the UE utilizing PUSCH in a semi-persistent manner after the timing information is received by the UE.

11. The apparatus of claim 9, wherein the timing information is transmitted to the UE in a radio resource control (RRC) reconfiguration message.

12. The apparatus of claim 11, wherein the processor and the memory are further configured to tune the UE to the target base station after interpreting the RRC reconfiguration message.

13. A method for handover operation management by a source base station, comprising:
    transmitting a reference signal configuration of a user equipment (UE) to a target base station;
    receiving, during a handover preparation operation between the source base station and the target base station, timing information from the target base station, wherein the timing information is estimated by the target base station based at least in part on reference signal information of the UE that is monitored by the target base station using the reference signal configuration information;
    negotiating with the target base station physical random access channel (PUSCH) resources during the handover preparation operation; and
    transmitting the timing information to the UE to forgo a PRACH procedure, wherein the timing information is transmitted prior to an occurrence of the PRACH procedure.

14. The method of claim 13, wherein transmitting the timing information to the UE comprises transmitting the timing information in a radio resource control (RRC) reconfiguration message.

15. The method of claim 13, further comprising assigning PUSCH resources for the target base station.

16. The method of claim 15, further comprising transmitting a resource assignment message that indicates the assigned PUSCH resources to the UE in a form of semi-persistent manner.

17. The method of claim 16, wherein the resource assignment message is transmitted with media access control (MAC) signaling.

18. The method of claim 15, further comprising transmitting an indication within downlink control information (DCI) specifying that the assigned PUSCH resources are for the target base station.

* * * * *